US007611390B2

(12) United States Patent
Nakazawa

(10) Patent No.: US 7,611,390 B2
(45) Date of Patent: Nov. 3, 2009

(54) TERMINAL CONNECTION STRUCTURE FOR A BATTERY

(75) Inventor: Yoshihiro Nakazawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 632 days.

(21) Appl. No.: 11/033,806

(22) Filed: Jan. 13, 2005

(65) Prior Publication Data

US 2005/0153201 A1 Jul. 14, 2005

(30) Foreign Application Priority Data

Jan. 14, 2004 (JP) ............................. 2004-006682

(51) Int. Cl.
*H01R 4/30* (2006.01)
(52) U.S. Cl. .................. 439/755; 429/178; 439/801
(58) Field of Classification Search ........... 439/801, 439/727, 807, 815, 765, 489, 491, 754, 755, 439/766, 771; 411/551, 549, 349, 400, 197, 411/204, 214, 215, 271, 303, 313; 429/178, 429/179, 182, 183
See application file for complete search history.

(56) References Cited

U.S. PATENT DOCUMENTS 3,068,445 A * 12/1962 Crowther ................... 403/391
3,303,735 A * 2/1967 Fisher ....................... 411/400
5,403,678 A * 4/1995 Fields ........................ 439/522
6,830,490 B2 * 12/2004 Murakami et al. .......... 439/762

FOREIGN PATENT DOCUMENTS

JP        2000-260420         9/2000

* cited by examiner

*Primary Examiner*—Felix O Figueroa
(74) *Attorney, Agent, or Firm*—Westerman, Hattori, Daniels & Adrian, LLP.

(57) ABSTRACT

A terminal connection structure for a battery which is electrically connected to a battery terminal includes a terminal plate having an attachment hole and a side plate connected perpendicularly to the plate. A terminal metal member, having a fitting hole corresponding to the attachment hole, is provided at the end of a cable to contact the plate surface by way of a terminal connector. The terminal connector includes a terminal engaging member, integrally comprising a shaft portion and an engaging portion. The shaft is fitted in the fitting hole and the attachment hole so that the terminal metal member is contacted with the plate surface. The engaging portion is substantially L-shaped and projects sidewardly from an end of the shaft, engaging with a rear face of the plate. A nut is screwed on the shaft so that the terminal metal member is provided between the nut and the plate surface.

9 Claims, 9 Drawing Sheets

TERMINAL CONNECTION STRUCTURE FOR A BATTERY

FIELD OF INVENTION

This invention generally relates to a terminal connection structure for a battery for electrically connecting to a battery terminal which is provided on a battery and has a terminal plate having an attachment hole provided therein and a side plate connecting perpendicularly to the terminal plate, a terminal metal member, which has a fitting hole corresponding to the attachment hole and is provided at an end portion of a cable for being contacted with a surface of the terminal plate, by means of a terminal connector.

BACKGROUND OF THE INVENTION

In general, a terminal connection structure for a battery is known wherein a battery terminal is provided on a battery for electrically connecting a terminal metal member provided at an end portion of a battery cable. A battery terminal of this type has a terminal plate for being contacted with the terminal metal member, and a side plate connecting perpendicularly to the terminal plate and a bolt is fitted in the terminal metal member and the terminal plate and screwed in a nut which is contacted with a rear face of the terminal plate. One example of such a structure is disclosed in Japanese Patent Laid-open No. 2000-260420.

When a vehicle, such as a motorcycle, is shipped from an assembly factory, electrical connection of cables and a battery for supplying electrical power to various electrical apparatus carried on the vehicle are not established. Therefore, in order to perform a starting test of the vehicle, it is necessary to temporarily connect the cables to the battery. However, if, upon normal operation of the vehicle bolts and nuts are used to connect a cable to the battery, then more labor and time will be required for such connection and disconnection.

SUMMARY OF THE INVENTION

The present invention has been made in view of such a circumstance as described above. It is an object of the present invention to provide a terminal connection structure for a battery which facilitates operation when a cable is temporarily connected to a battery to allow reduction of the number of man-hours.

According to the present invention, there is provided a terminal connection structure for a battery which is electrically connected to a battery terminal includes a terminal plate having an attachment hole and a side plate connected perpendicularly to the plate. A terminal metal member, having a fitting hole corresponding to the attachment hole, is provided at the end of a cable to contact the plate surface by way of a terminal connector. The terminal connector includes a terminal engaging member, integrally comprising a shaft portion and an engaging portion. The shaft is fitted in the fitting hole and the attachment hole so that the terminal metal member is contacted with the plate surface. The engaging portion is substantially L-shaped and projects sidewardly from an end of the shaft, engaging with a rear face of the plate. A nut is screwed on the shaft so that the terminal metal member is provided between the nut and the plate surface.

According to another embodiment of the present invention, a terminal connection structure for a battery is characterized in that the nut is screwed at a multi-thread screw portion on the shaft portion.

According to another embodiment of the present invention, a terminal connection structure for a battery is characterized in that, the length from an axial line of the shaft portion to an end of the engaging portion is set greater than the length from the center of the attachment hole to the side plate by a value exceeding a deviation obtained by subtracting the diameter of the shaft portion from the diameter of the attachment hole.

According to another embodiment of the present invention, a terminal connection structure for a battery is characterized in that, a tapered chamfered portion is formed on an outer periphery of an end portion of the nut adjacent the terminal plate.

According to another embodiment of the present invention, a terminal connection structure for a battery is characterized in that, the nuts for the pair of terminal connectors individually corresponding to the positive side and negative side battery terminals are colored in different colors from each other.

According to another embodiment of the present invention, a terminal connection structure for a battery is characterized in that, a transverse sectional outer profile of the nut is formed in a polygonal shape or in a circular shape having a plurality of grooves.

According to another embodiment of the present invention, a terminal connection structure for a battery is characterized in that, a detachment preventing member for preventing the nut from coming off from the shaft portion is securely mounted at the other end of the shaft portion provided on the terminal engaging member, and a connecting portion with which a string is to be tied is provided integrally on the detachment preventing member.

According to another embodiment of the present invention, a terminal connection structure for a battery is characterized in that, the connecting portion is provided on the detachment preventing member such that the position thereof along a circumferential direction of the nut is substantially same as the position of the engaging portion of the terminal engaging member.

According to another embodiment of the present invention, a terminal connection structure for a battery is characterized in that, the connecting portions of the pair of terminal connectors individually corresponding to the positive side and negative side battery terminal are tied with each other by the string.

According to another embodiment of the present invention, a terminal connection structure for a battery is characterized in that a tag serving as a sign is provided on the string.

According to the first aspect of the present invention the terminal metal member of the cable is contacted with the surface of the terminal plate of the battery terminal. In this condition, the terminal engaging member of the terminal connector is fitted from the engaging portion thereof into the fitting hole and the attachment hole, and then the tightening operation of the nut is performed. Consequently, the terminal metal member can be electrically connected to the battery terminal in such a manner that the terminal metal member and the terminal plate are provided between the engaging portion of the terminal engaging member and the nut. On the other hand, in order to cancel the electric connection state of the terminal metal member to the battery terminal, it is only necessary to loosen the nut and then remove the terminal engaging member from the attachment hole and the fitting hole. Consequently, operation when the cable is temporarily connected to the battery is facilitated, and reduction of the man-hours can be achieved.

According to the second aspect of the present invention, the nut is screwed at the multi-thread screw portion thereof on the shaft portion of the terminal engaging member. Consequently, tightening and loosening operations of the nut to and from the shaft portion can be performed rapidly.

According to the third aspect of the present invention, when the nut is tightened or loosened in a state wherein the terminal engaging member is fitted in the attachment hole and the fitting hole, since the engaging portion of the terminal engaging member is contacted with the side plate of the battery terminal, turning of the terminal engaging member together with the nut is prevented. Thus, the tightening and loosening operations of the nut to and from the shaft portion are further facilitated.

According to the forth aspect of the present invention, although it is demanded, when the terminal engaging member of the terminal connector is fitted into the fitting hole and the attachment hole or removed from the attachment hole and the fitting hole, to incline the terminal engaging member with respect to the axial line of the attachment hole and the fitting hole because the terminal engaging member has a substantially L shape, since the tapered chamfered portion is formed on the outer periphery of the end portion of the nut adjacent the terminal plate, interference between the nut of the inclined terminal connector and the terminal metal member does not occur. Thus, the fitting and removing operations of the terminal engaging member into and from the fitting hole and the attachment hole can be facilitated.

According to the fifth aspect of the present invention, the pair of terminal connectors individually corresponding to the positive side and negative side battery terminals can be identified readily.

According to the sixth aspect of the present invention, when the outer periphery of the nut is gripped to perform turning operation of the nut, the nut can be gripped readily and the turning operation of the nut is facilitated.

According to the seventh aspect of the present invention, the string tied with the terminal connector can be tiled with another location. Consequently, such a situation that the terminal connector drops or the terminal connector is lost can be minimized.

According to the eighth aspect of the present invention, when the fitting operation of the terminal engaging member into the attachment hole and the fitting hole and the removing operation of the terminal engaging member from the attachment hole and the fitting hole are performed, the direction the engaging portion of the terminal engaging member is directed can be confirmed through visual observation of the connecting portion of the detachment preventing member, even though the engaging portion is hidden by the terminal plate. Thus, since the direction in which the terminal engaging member is to be inclined can be discriminated readily, the fitting and removing operations are further facilitated.

According to the ninth aspect of the present invention, since the pair of terminal connectors are tied with each other by the string, not only it can be prevented that one of the terminal connectors drops, but also that it is forgotten to remove the terminal metal members from the battery terminals after the terminal metal members are temporarily connected to the battery terminals can be prevented through visual observation of the presence of the string.

According to the tenth aspect of the present invention, that it is forgotten to remove the terminal metal members from the battery terminals after the terminal metal members are temporarily connected to the battery terminals can be prevented with a higher degree of certainty by visual observation of the tag attached to the string.

BRIEF DESCPTION OF THE DRAWINGS

A preferred embodiment of the present invention will be described with reference to the accompanying drawings, wherein:

A preferred embodiment of the present invention will be described with reference to the accompanying drawings, wherein.

Figure 4:
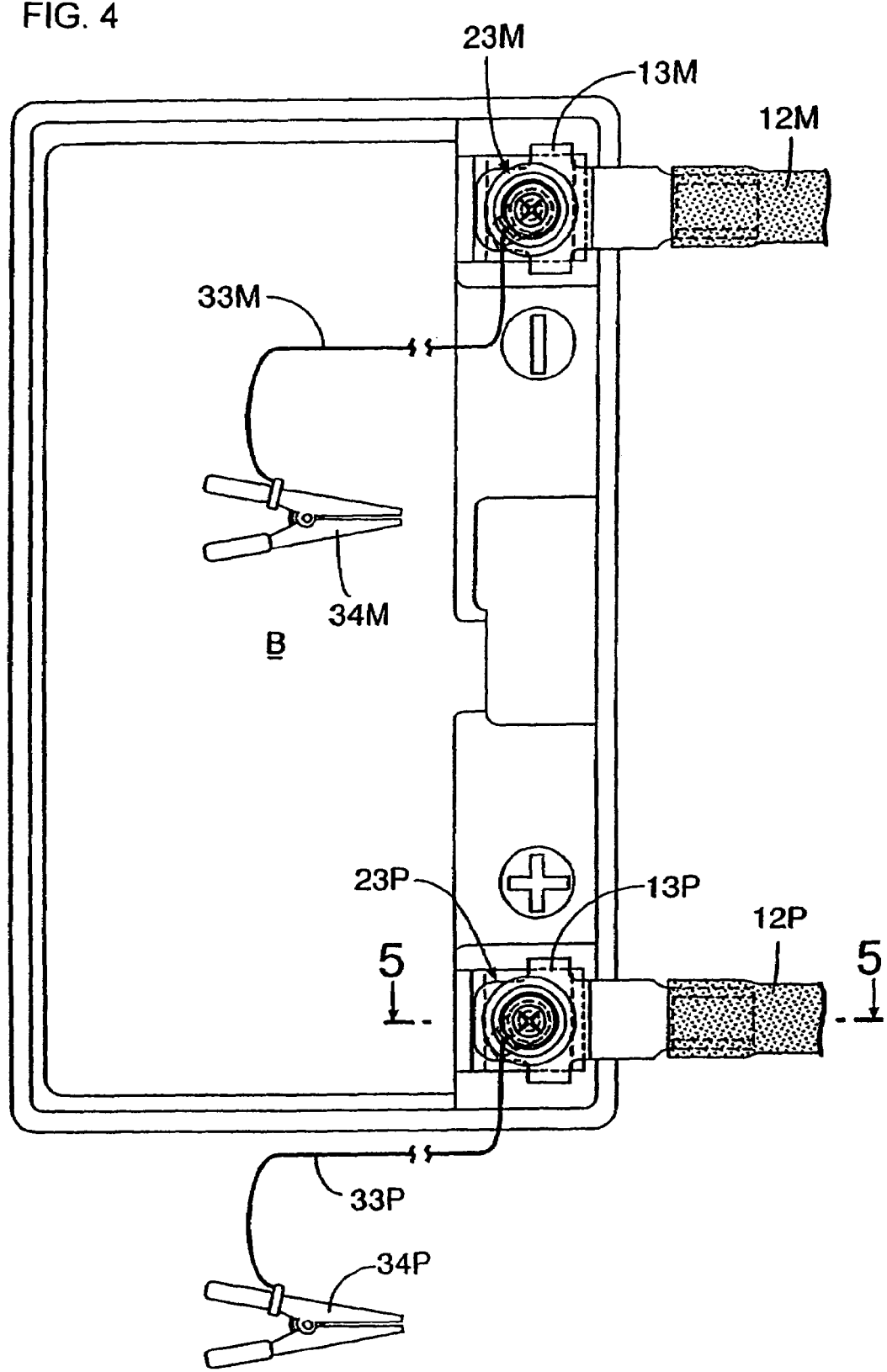
FIG. 4 is a plan view corresponding to FIG. 1 in a state wherein a cable is temporarily connected to a battery using a terminal connector.
Figure 5:
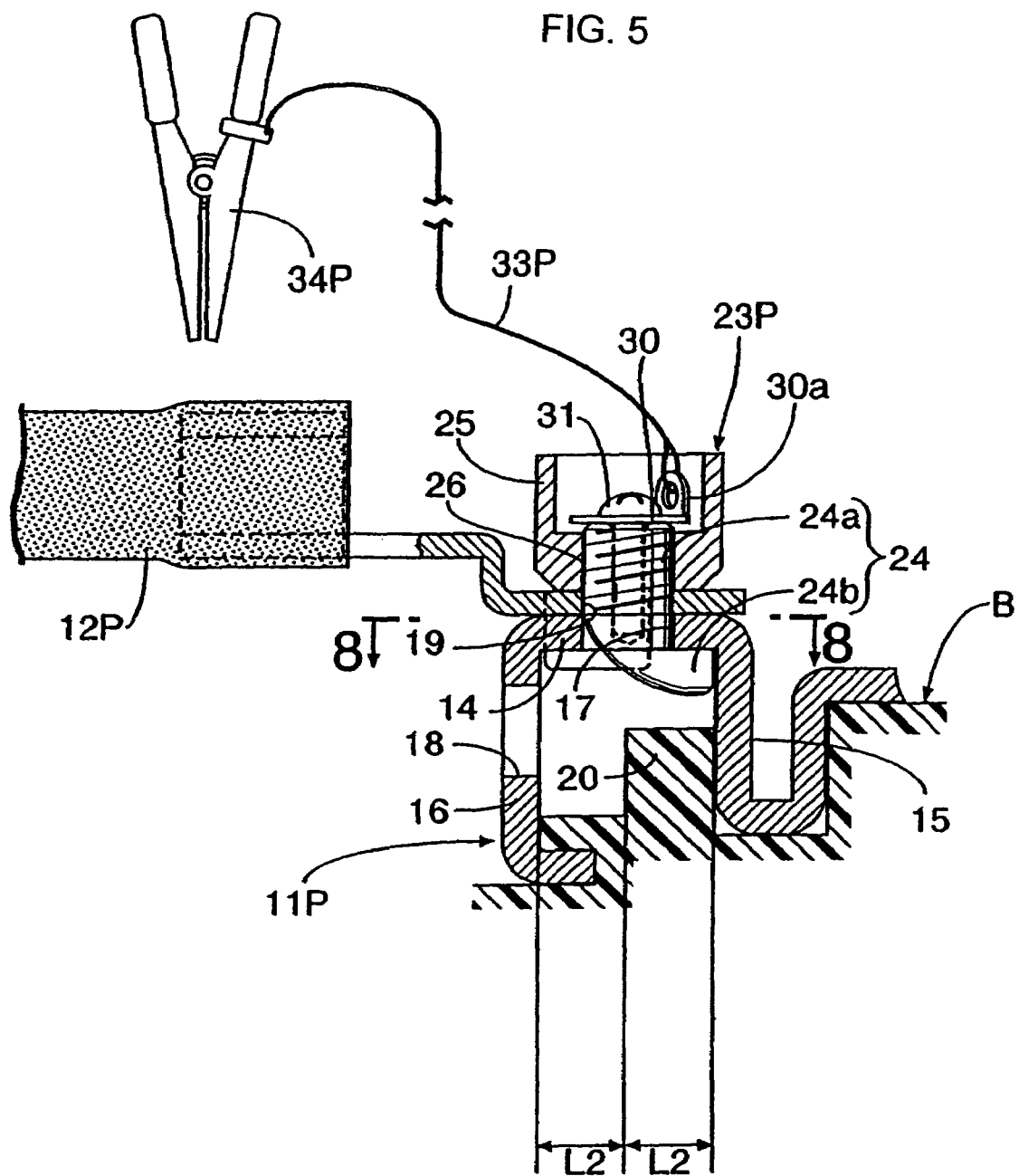
FIG. 5 is an enlarged sectional view taken along line 5-5 of FIG. 4.
Figure 6:
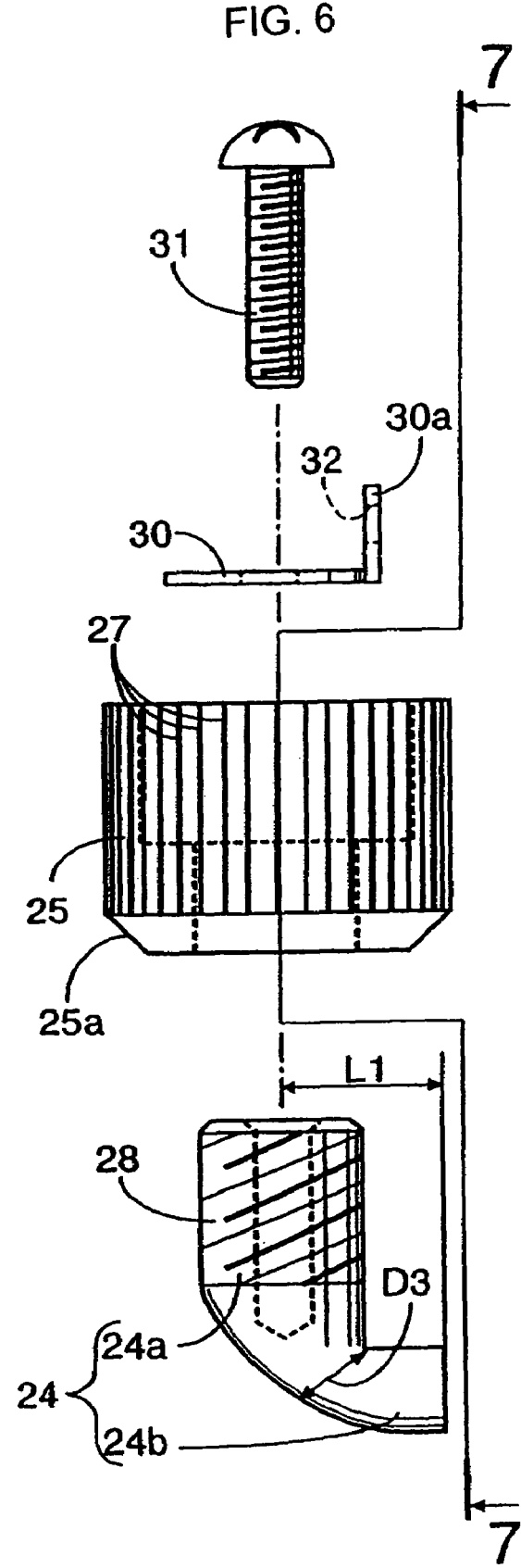
FIG. 6 is a side elevational view in a state wherein the terminal connector is disassembled.
Figure 7:
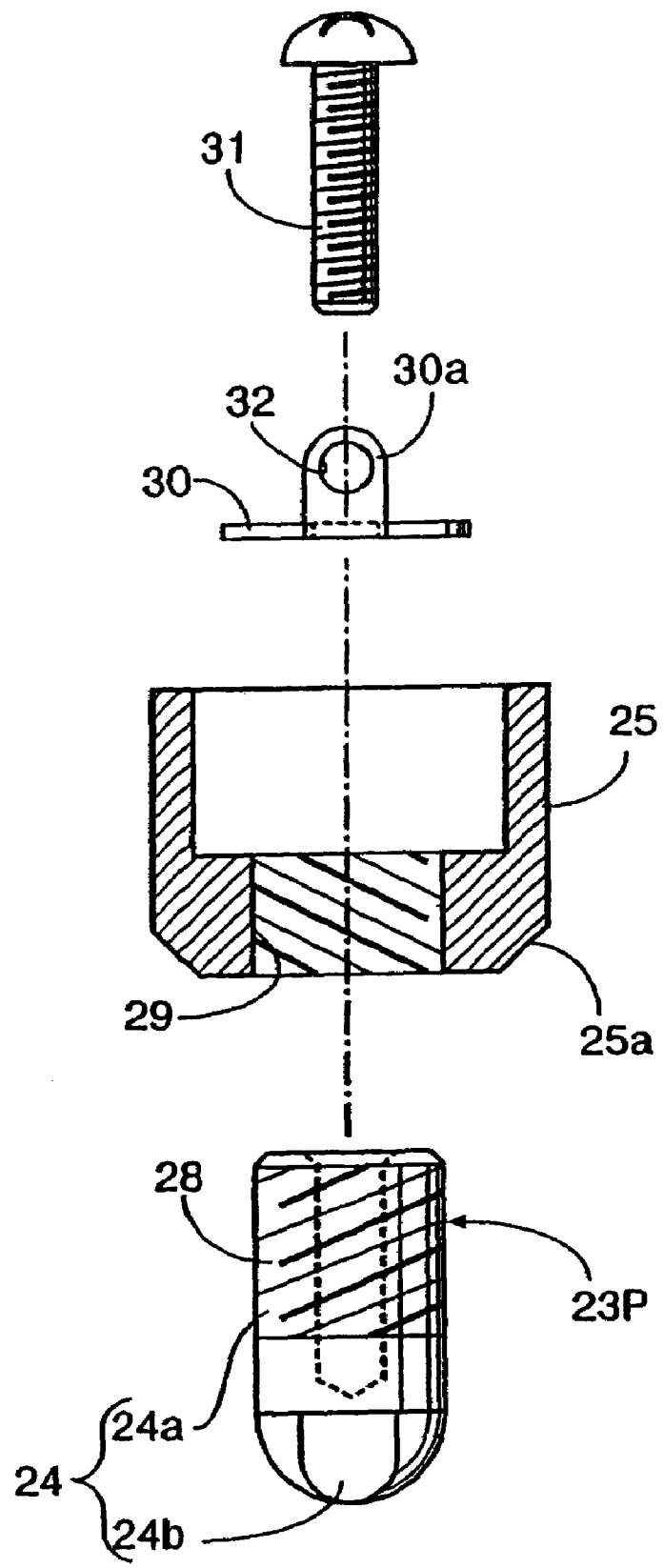
FIG. 7 is a sectional view taken along line 7-7 of FIG. 6.
Figure 8:
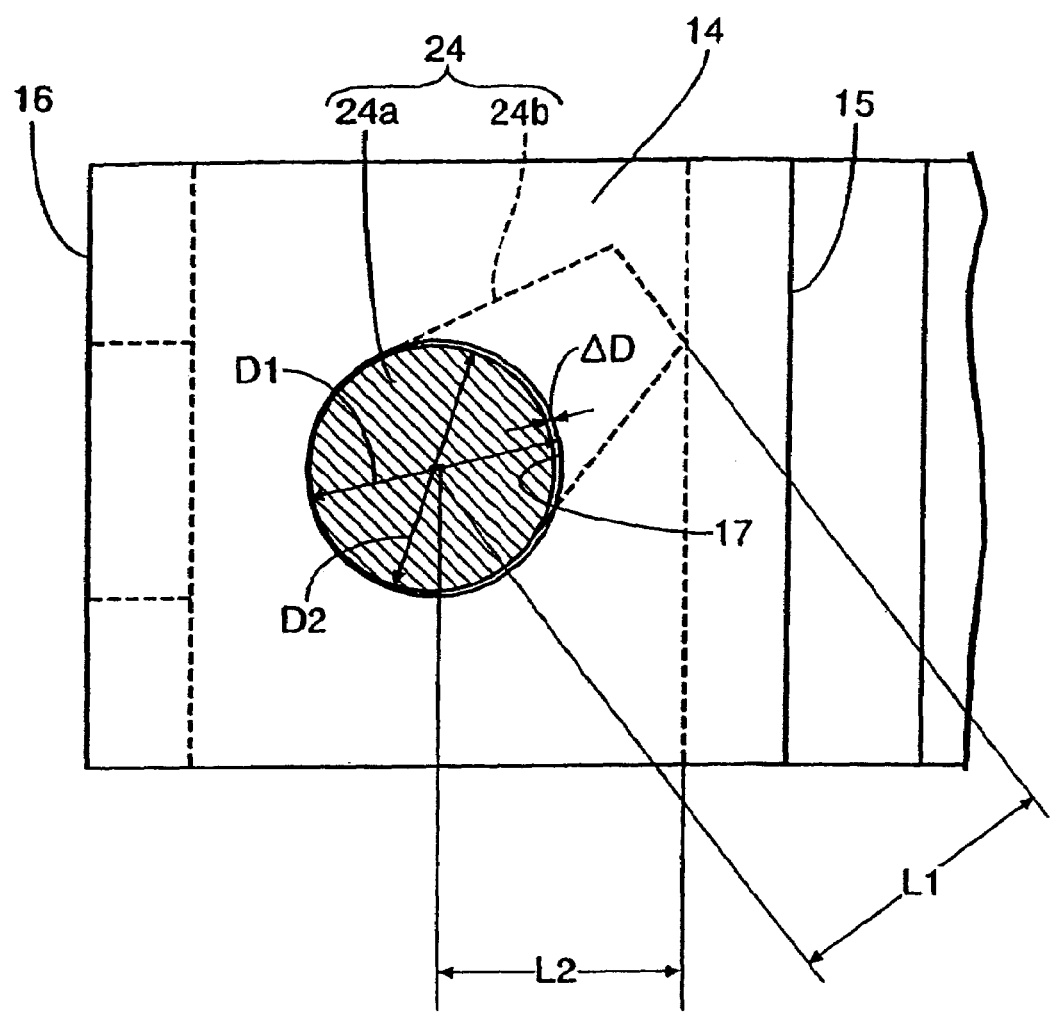
FIG. 8 is an enlarged sectional view taken along line 8-8 of FIG. 5.
Figure 9:
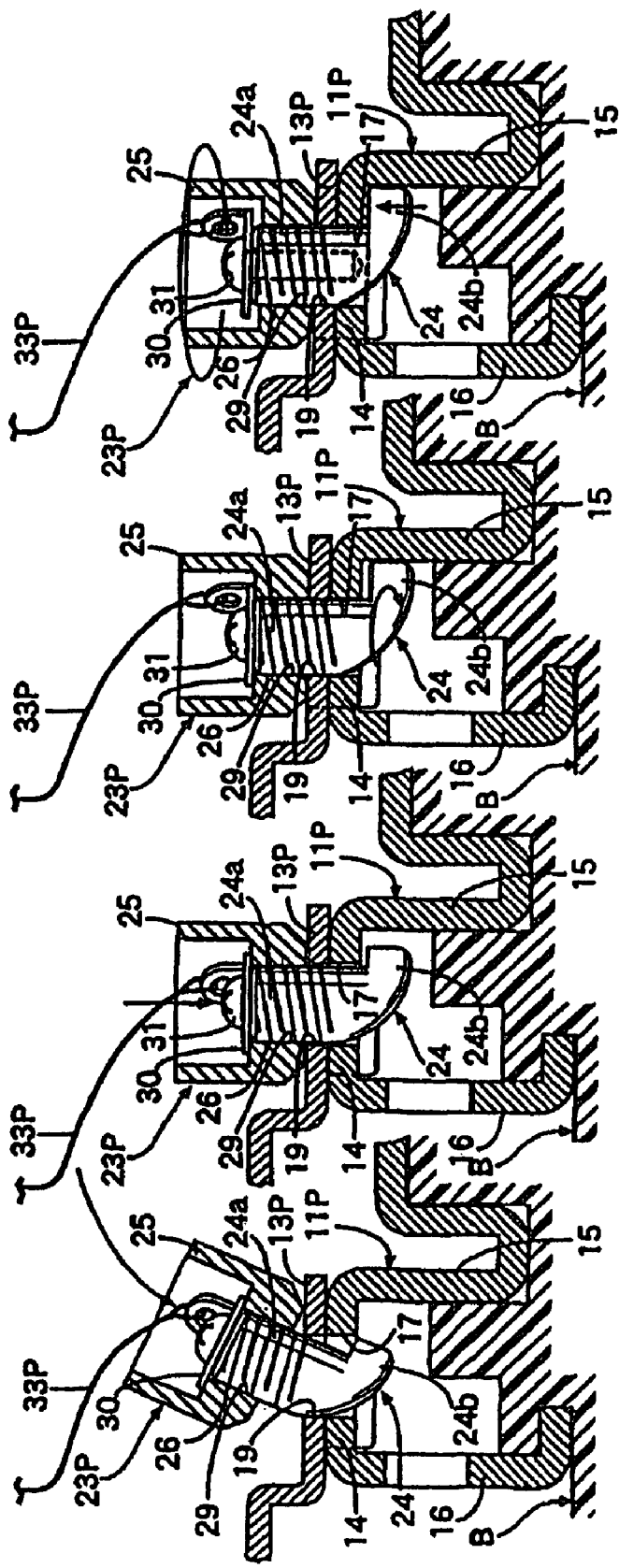
Figure 10:
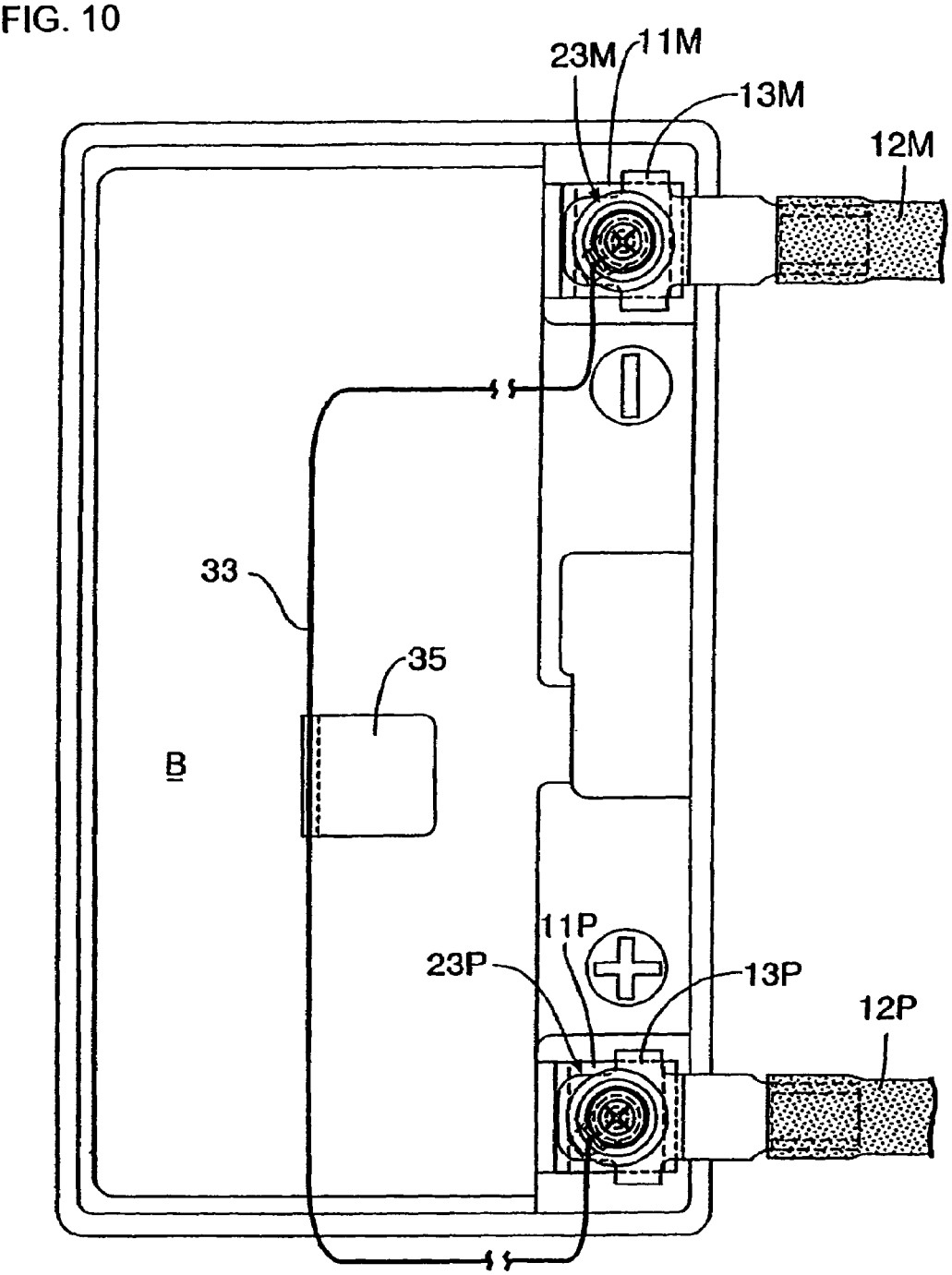

FIGS. 9(A) to 9(D) are sectional views successively illustrating steps at which the terminal metal element is temporarily connected to the battery terminal; and FIG. 10 is a plan view corresponding to FIG. 4 of a second working example.

DETAILED DESCRIPTION OF THE INVENTION

Figure 1:
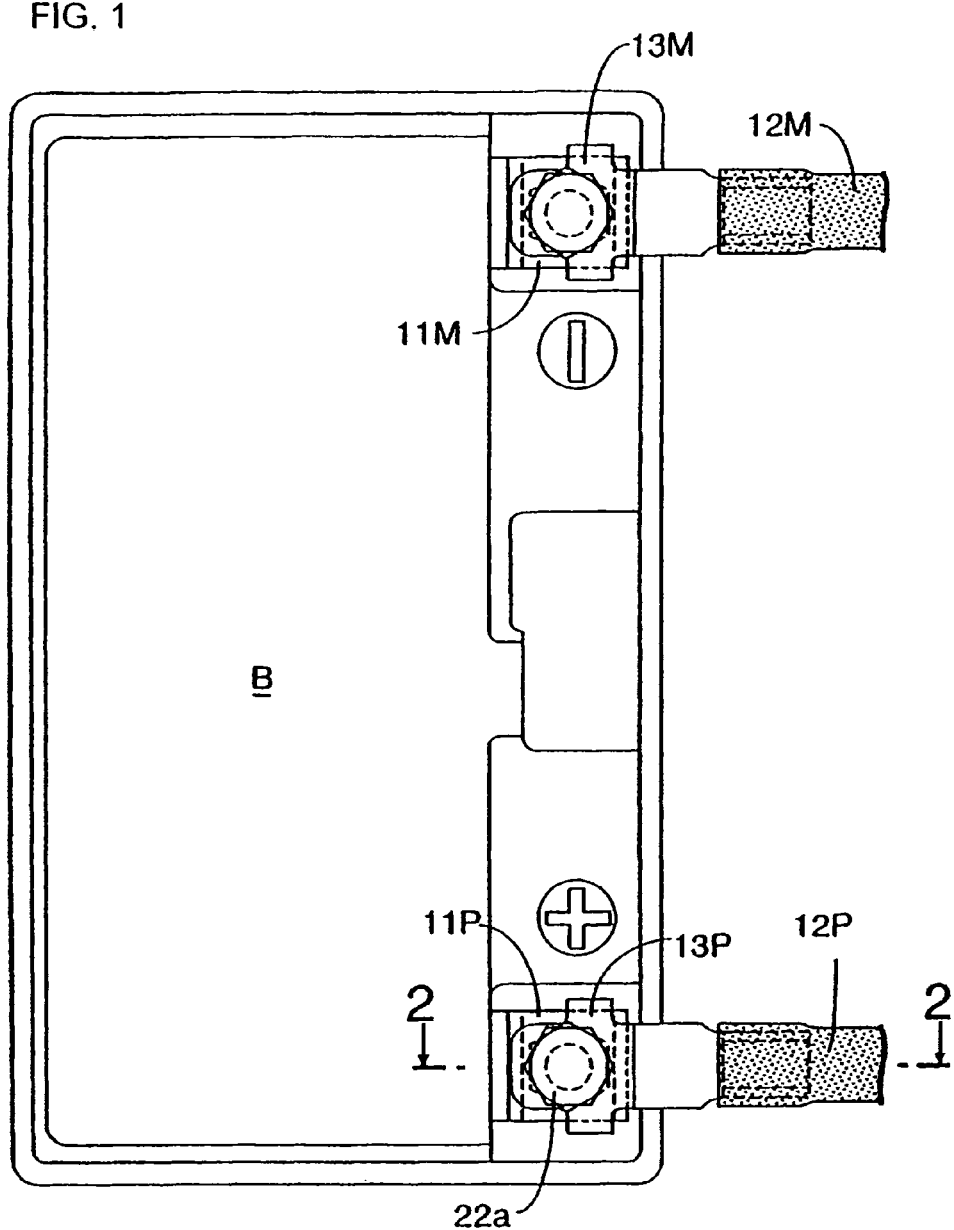
FIG. 1 is a plan view of a battery carried on a vehicle in an ordinary operation condition.

FIG. 1 is a plan view if a battery carried on a vehicle in an ordinary operation condition. Positive side and negative side battery terminals 11P and 11M are provided on an upper face of a battery B carried on a vehicle, for example, a motorcycle. A positive side terminal metal member 13P provided at an end portion of a positive side cable 12P is electrically connected to the positive side battery terminal 11P. A negative side terminal metal member 13M provided at an end portion of a negative side cable 12M is electrically connected to the negative side battery terminal 11M.

Figure 2:
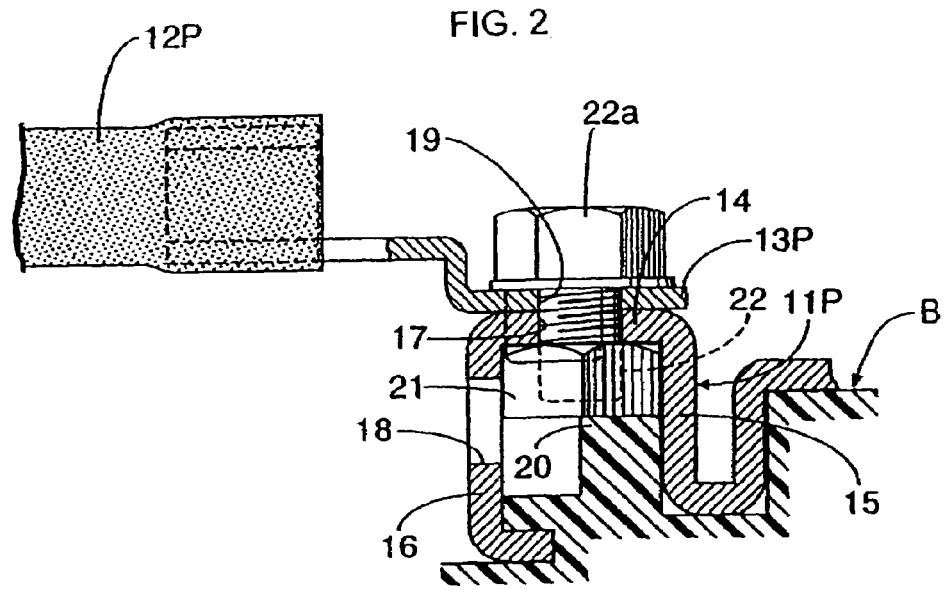
FIG. 2 is an enlarged sectional view taken along line 2-2 of FIG. 1.

FIG. 2 is an enlarged sectional view taken along line 2-2 of FIG. 1. The positive side battery terminal 11P includes a terminal plate 14, a first side plate 15 connecting perpendicularly to an end of the terminal plate 14, and a second side plate 16 connecting perpendicularly to the other end of the terminal plate 14 and extending in parallel to the first side plate 15. An attachment hole 17 is provided at a central portion of the terminal plate 14.

Meanwhile, the positive side terminal metal member 13P provided at the end portion of the cable 12P can contact with the surface of the terminal plate 14, and an fitting hole 19 corresponding to the attachment hole 17 of the terminal plate 14 is provided in the terminal metal member 13P. Further, a projection 20 is provided integrally in a projecting manner on the battery B in such a manner as to have a substantially L-shaped transverse sectional shape. The projection 20 is opposed in a spaced relationship to the rear face of the terminal plate 14 and opposed in a spaced relationship to the rear face of the second side plate 16.

In order to electrically connect the terminal metal member 13P to the terminal plate 14, a nut 21 is inserted between the terminal plate 14 and the projection 20 of the battery B. The nut 21 is in a state wherein an outer face of a hexagonal transverse sectional shape thereof is engaged with the first and second side plates 15 and 16 to prevent turning thereof. Then, the terminal metal member 13P is contacted with the surface of the terminal plate 14, and in this state, a bolt 22 is fitted into the fitting hole 19 and the attachment hole 17 and screwed into and tightened with the nut 21. Consequently, the terminal metal member 13P is electrically connected to the battery terminal 11P in such a manner that it is sandwiched between the terminal plate 14 and a head portion 22a of the bolt 22.

It is to be noted that it is also possible for the second side plate 16 to function as the terminal plate 14, and an attachment hole 18 for this object is provided at a central portion of the second side plate 16. In this instance, in order to electrically connect the terminal metal member 13P to the second side plate 16, the nut 21, which is in a state wherein outer faces thereof engage with the projection 20 and the terminal plate 14 of the battery B to prevent turning thereof, is inserted between the second side plate 16 and the projection 20. Then, the terminal metal member 13P is contacted with the surface of the second side plate 16, and in this state, the bolt 22 is inserted into the fitting hole 19 and the attachment hole 18 and screwed into and tightened with the nut 21.

Also electric connection between the negative side battery terminal 11M and the negative side terminal metal member 13M provided at the end portion of the negative side cable 12M is established by a structure similar to the electric connection structure between the positive side battery terminal 11P and the positive side terminal metal member 13P described above. Detailed description of the electric connection is omitted herein.

Figure 3:
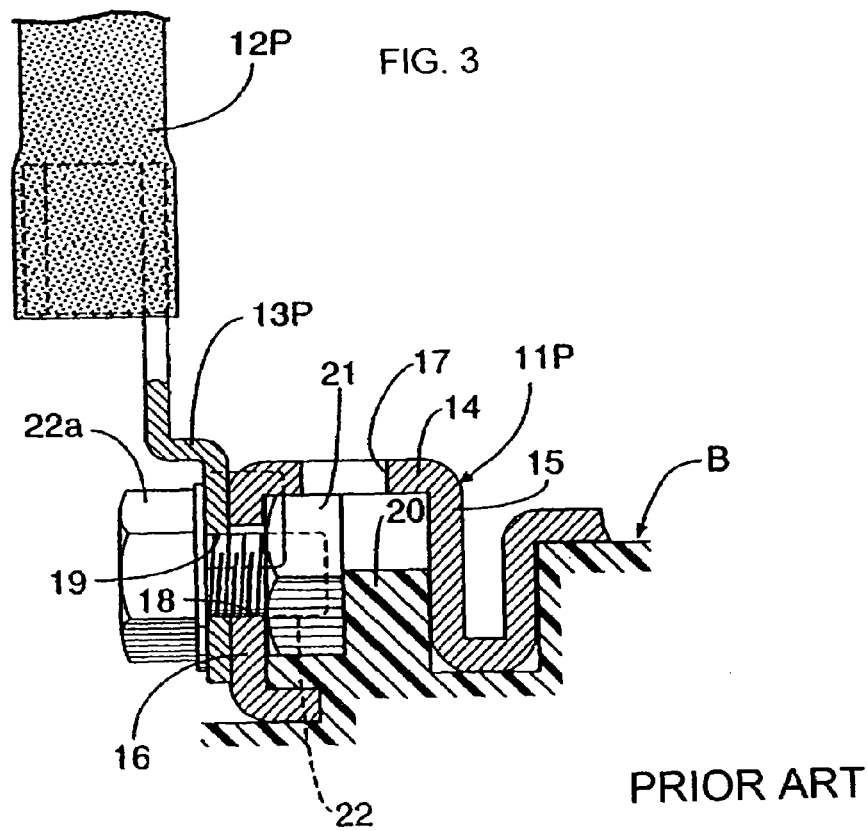
FIG. 3 is a sectional view corresponding to FIG. 2 in a state wherein a terminal metal part is connected to a battery terminal at a position different from that in FIG. 2.

Incidentally, the electric connection between the battery terminals 11P and 11M and the terminal metal members 13P and 13M described hereinabove with reference to FIGS. 2 and 3 is performed while the vehicle is in a normal operation condition. When the vehicle is shipped from an assembly factory, the electric connection of the cables 12P and 12M and the battery B for supplying electric power to various electric apparatus carried on the vehicle is not established as yet. Thus, in order to perform a starting test of the vehicle in this state, it is necessary to temporarily connect the cables 12P and 12M to the battery B. For such temporary connection, the positive side terminal metal member 13P is temporarily connected to the positive side battery terminal 11P using a positive side terminal connector 23P, and the negative side terminal metal member 13M is temporarily connected to the negative side battery terminal 11M using a negative side terminal connector 23M as shown in FIG. 4.

Referring to FIGS. 5 to 8, the positive side terminal connector 23P includes a substantially L-shaped terminal engaging member 24 and a nut 25. The terminal engaging member 24 has a shaft portion 24a and an engaging portion 24b integrally thereon. The shaft portion 24a is fitted in the fitting hole 19 and the attachment hole 17 in a state wherein the terminal metal member 13P is held in contact with the surface of the terminal plate 14 of the positive side battery terminal 11P. The engaging portion 24b projects sidewardly from an end of the shaft portion 24a and engages with the rear face of the terminal plate 14. The nut 25 is screwed at a multi-thread screw portion, for example, a double-thread screw portion 26 thereof with the shaft portion 24a of the terminal engaging member 24 such that the terminal metal member 13P can be sandwiched between the nut 25 and the surface of the terminal plate 14.

An outer circumferential face of a connecting portion between the shaft portion 24a and the engaging portion 24b on the opposite side to the engaging portion 24b is rounded arcuately so that it may not be caught by the terminal metal member 13P and the terminal plate 14 when an operation of inserting and removing the terminal engaging member 24 into and from the fitting hole 19 of the terminal metal member 13P and the attachment hole 17 of the terminal plate 14.

Further, the terminal engaging member 24 is formed such that, when the shaft portion 24a, which is held in a state wherein it is fitted in the attachment hole 17 of the terminal plate 14, is turned around the axis thereof, the engaging portion 24b is brought into contact or engagement with one of the first and second side plates 15 and 16.

In particular, where the deviation obtained by subtracting the diameter D2 of the shaft portion 24a from the diameter D1 of the attachment hole 17 is represented by ΔD, the length L1 from the axial line of the shaft portion 24a to the end of the engaging portion 24b is set greater by a value exceeding the deviation ΔD than the length L2 from the center of the attachment hole 17 to the first and second side plates 15 and 16 (L1>L2+ΔD). Thus, when the shaft portion 24a in a state wherein it is fitted in the attachment hole 17 is turned around the axial line thereof, the end of the engaging portion 24b is brought into contact with one of the first and second side plates 15 and 16 so that further turning motion of the shaft portion 24a is blocked.

Further, the connecting portion between the shaft portion 24a and the engaging portion 24b of the terminal engaging member 24 is rounded so that the outer diameter D3 (refer to FIG. 6) thereof may be smaller than the diameter D1 of the attachment hole 17. Consequently, when operation of inserting and removing the terminal engaging member 24 into and from the attachment hole 17, the connecting portion can smoothly pass through the attachment hole 17.

The nut 25 is formed in a bottomed cylindrical shape having a transverse sectional outer shape formed as a polygonal shape or a circular shape. In the present working example, the nut 25 is formed in a bottomed cylindrical shape having a circular transverse sectional outer shape. A plurality of grooves 27 are formed on an outer periphery of the nut 25 by knurling. Meanwhile, a tapered chamfered portion 25a is formed on an outer periphery of an end portion of the nut 25 adjacent the terminal plate 14.

A threaded hole 29 into which a two-thread male screw 28 provided on an outer periphery of the shaft portion 24a is to be screwed is provided at a central portion of a closed end of the nut 25. To the other end of the shaft portion 24a projecting from the threaded hole 29, a disk-shaped detachment preventing member 30 is secured by means of a screw member 31. The detachment preventing member 30 contacts with the closed end of the nut 25 to block the shaft portion 24a, that is, the terminal engaging member 24, from coming off from the nut 25.

A connecting portion 30a with which a string is to be tied is provided integrally on the detachment preventing member 30. The connecting portion 30a is provided perpendicularly at one place of an outer periphery of the detachment preventing member 30 and has a perforation 32 into which a string 33P is to be threaded. Besides, the detachment preventing member 30 is attached to the other end of the shaft portion 24a such that the position of the connecting portion 30a along a circumferential direction of the nut 25 is registered with the engaging portion 24b of the terminal engaging member 24.

The temporary connection of the negative side battery terminal 11M and the negative side terminal metal member 13M is performed using the terminal connector 23M similar to the terminal connector 23P used for the temporary connection of the positive side battery terminal 11P and the positive side terminal metal member 13P described above. As seen in FIG. 4, to strings 33P and 33M tied with the connecting portions 30a of the two terminal connectors 23P and 23M, for example, clips 34P and 34M for removably fastening the strings 33P and 33M to other locations of the vehicle body are attached, respectively.

The nuts 25 of the pair of terminal connectors 23P and 23M individually corresponding to the positive side and negative side battery terminals 11P and 11M are colored in different colors from each other.

Operation of the first working example is described. Each of the terminal connectors 23P and 23M for temporarily and electrically connecting the terminal metal members 13P and 13M of the positive side and negative side cables 12P and 12M to the battery terminals 11P and 11M provided on the battery B includes a terminal engaging member 24 and a nut 25. The terminal engaging member 24 has a shaft portion 24a and an engaging portion 24b integrally thereon and is formed in a generally L shape. The shaft portion 24a is fitted in the fitting hole 19 and the attachment hole 17 in a state wherein the terminal metal member 13P or 13M is held in contact with the surface of a corresponding one of the terminal plates 14 of the battery terminals 11P and 11M. The engaging portion 24b projects sidewardly from an end of the shaft portion 24a and engages with the rear face of the terminal plate 14. The nut 25 is screwed at a multi-thread screw portion, for example, a double-thread screw portion 26 thereof with the shaft portion 24a of the terminal engaging member 24 such that the terminal metal member 13P or 13M can be sandwiched between the nut 25 and the surface of the terminal plate 14.

The terminal metal member 13P of the positive side cable 12P is electrically connected to the battery terminal 11P in accordance with a procedure illustrated in FIGS. 9(A) to 9(D). First, as shown in FIG. 9(A), in a state where the terminal metal member 13P is contacted with the surface of the terminal plate 14 of the battery terminal 11P, the engaging portion 24b of the terminal engaging member 24 of the terminal connector 13P is fitted into the fitting hole 19 of the terminal metal member 13P and the attachment hole 17 of the terminal plate 14 while the terminal engaging member 24 is being inclined. Then as shown in FIG. 9(B), the posture of the terminal connector 23P is determined such that the shaft portion 24a of the terminal engaging member 24 may be placed into a coaxial relationship with the fitting hole 19 and the attachment hole 17. Thereupon, the nut 25 of the terminal connector 23P is placed into contact with the terminal metal member 13P in such a manner that the terminal metal member 13P is sandwiched between the nut 25 and the terminal plate 14. Thus, if the nut 25 is operated to turn so as to be tightened, then there is the possibility that the terminal engaging member 24 may be turned together a little. However, the terminal engaging member 24 is formed such that, when the shaft portion 24a in a state wherein it is fitted in the attachment hole 17 is turned around the axial line thereof, the engaging portion 24b is brought into contact and engagement with one of the first and second side plates 15 and 16. Therefore, even if the shaft portion 24a, which is in a state wherein it is fitted in the attachment hole 17, is turned even only a little around the axial line thereof, the end of the engaging portion 24b is brought into contact with one of the first and second side plates 15 and 16, in the present working example, with the first side plate 15 as seen in FIG. 9(C) and further turning movement of the shaft portion 24a is blocked. Therefore, if the nut 25 is further operated to turn, then it can be tightened so that the engaging portion 24b contacts with the rear face of the terminal plate 14 while the terminal engaging member 24 is not turned. Thus, the terminal metal member 13P can be electrically connected to the battery terminal 11P in such a manner that the terminal metal member 13P and the terminal plate 14 are sandwiched between the engaging portion 24b of the terminal engaging member 24 and the nut 25.

The procedure for electrically connecting the terminal metal member 13M of the cable 12M to the battery terminal 11M is similar to that described above.

In order to cancel the electrically connected state of the terminal metal members 13P and 13M to the battery terminals 11P and 11M, it is only necessary to loosen the nuts 25 and then remove the terminal engaging members 24 from the attachment holes 17 and the fitting holes 19. Thus, operation when the cables 12P and 12M are temporarily connected to the battery B is facilitated, and reduction in number of the man-hours can be achieved.

Since the nuts 25 are screwed with the shaft portions 24a of the terminal engaging members 24, tightening and loosening operations of the nuts 25 to and from the shaft portions 24a can be performed very quickly.

Further, since turning of the terminal engaging member 24 together with the nut 25 upon tightening or loosening of the nut 25 in a state wherein the terminal engaging member 24 is fitted in the attachment hole 17 and the fitting hole 19 can be prevented as described hereinabove, tightening and loosening operations of the nut 25 to and from the shaft portion 24a of the terminal engaging member 24 are further facilitated.

As shown in FIG. 9(A), when the terminal engaging member 24 is fitted into the fitting hole 19 and the attachment hole 17 or removed from the attachment hole 17 and the fitting hole 19, since the terminal engaging member 24 has a substantially L shape, it is required to incline the terminal engaging member 24 with respect to the axial line of the attachment hole 17 and the fitting hole 19. However, since the tapered chamfered portion 25a is formed on the outer periphery of the end portion of the nut 25 adjacent the terminal plate 14, interference between a corresponding one of the nuts 25 . . . of the inclined terminal connectors 23P and 23M and the terminal metal member 13P or 13M does not occur. Therefore, the fitting and removing operations of the terminal engaging member 24 into and from the attachment hole 17 and the fitting hole 19 can be facilitated.

Further, since the transverse sectional outer profile of the nut 25 is formed in a polygonal shape or a circular shape having a plurality of grooves 27, when the nut 25 is gripped at the outer periphery thereof to perform turning operation thereof, the nut 25 can be gripped readily to facilitate the turning operation thereof.

The detachment preventing member 30 for blocking the nut 25 from coming off from the shaft portion 24a is secured to the other end of the shaft portion 24a of the terminal engaging member 24, and the connecting portion 30a with which the string 33P or 33M is to be tied is provided integrally on the detachment preventing member 30. Therefore, where the strings 33P and 33M tied with the connecting portions 30a of the terminal connectors 23P and 23M are attached, for example, to the clips 34P and 34M as in the present working example, they can be tied with other locations, and the terminal connectors 23P and 23M can be prevented from dropping or from being lost.

Further, the connecting portion 30a is provided on the detachment preventing member 30 such that the position thereof along a circumferential direction of the nut 25 may be substantially same as that of the engaging portion 24*b* of the terminal engaging member 24. Therefore, when the fitting operation of the terminal engaging member 24 into the attachment hole 17 and the fitting hole 19 and the removing operation of the terminal engaging member 24 from the attachment hole 17 and the fitting hole 19 are performed, in what direction the engaging portion 24*b* of the terminal engaging member 24 is directed can be confirmed by observing the connecting portion 30*a* of the detachment preventing member 30 although the engaging portion 24*b* is hidden by the terminal plate 14. Therefore, since the direction in which the terminal engaging member 24 is to be inclined can be determined readily, the fitting and removing operations are further facilitated.

Further, the nuts 25 of the pair of terminal connectors 23P and 23M individually corresponding to the positive side and negative side battery terminals 11P and 11M are colored in different colors from each other. Consequently, the pair of terminal connectors 23P and 23M individually corresponding to the positive side and negative side battery terminals 11P and 11M can be identified from each other readily.

FIG. 10 shows a second working example of the present invention. The terminal metal members 13P and 13M of the positive side and negative side cables 12P and 12M are connected to the positive side and negative side battery terminals 11P and 11M of the battery B using the terminal connectors 23P and 23M, respectively. The connecting portions 30*a* of the terminal connectors 23P and 23M are connected to each other by a string 33. Besides a tag 35 which servers as a sign is attached to the string 33.

According to this second working example, since the pair of terminal connectors 23P and 23M are tied with each other by the string 33, one of the two terminal connectors 23P and 23M can be prevented from dropping. Besides, the presence of the string 33 is visually observed. Thus, it prevents forgetting to remove the terminal metal members 13P and 13M from the battery terminals 11P and 11M after that the terminal metal members 13P and 13M are temporarily connected to the battery terminals 11P and 11M. Further, the tag 35 attached to the string 33 is visually observed. It prevents forgetting to remove the terminal metal members 13P and 13M from the battery terminals 11P and 11M with a higher degree of certainty after that the terminal metal members 13P and 13M are temporarily connected to the battery terminals 11P and 11M.

As a further working example, the string 33 for tying the terminal connectors 23P and 23M with each other may be made of a conductive material and a lighting element such as a lamp may be interposed intermediately of the string 33. According to the configuration, the lighting element continues to emit light while the terminal connectors 23P and 23M remain in contact with the battery terminals 11P and 11M. Therefore, it prevents forgetting to remove the terminal metal members 13P and 13M from the battery terminals 11P and 11M with a higher degree of certainty after that the terminal metal members 13P and 13M are temporarily connected to the battery terminals 11P and 11M.

Further, while, in the working examples described above, the terminal metal members 13P and 13M are contacted with the terminal plates 14 of the battery terminals 11P and 11M, it is otherwise possible to use the second side plate 16 provided on each of the battery terminals 11P and 11M as a terminal plate and connect the terminal metal members 13P and 13M to the second side plates 16. In this instance, the second side plate 16 functions as a terminal plate, and the terminal plate 14 functions as a side plate.

While working examples of the present invention are described above, the present invention is not limited to the working examples described above, but various design alterations can be made without departing from the present invention set forth in the claims.

In this detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

I claim:

1. A terminal connection structure for a battery which is electrically connected to a battery terminal, comprising:

a terminal plate having an attachment hole provided therein and a side plate connected perpendicularly to said terminal plate;

a terminal metal member having a fitting hole corresponding to said attachment hole and provided at an end portion of a cable to contact a surface of said terminal plate by way of a terminal connector, wherein said terminal connector includes a terminal engaging member, integrally comprising a shaft portion and an engaging portion, wherein said shaft portion is fitted in said fitting hole and said attachment hole so that said terminal metal member is contacted with the surface of said terminal plate;

said engaging portion is projected sidewardly from an end of said shaft portion, engaging with a rear face of said terminal plate and formed in a substantially L-shape; and said terminal metal member is provided between a nut screwed on said shaft portion of said terminal engaging member and the surface of said terminal plate, wherein a disk-shaped detachment preventing member for preventing said nut from coming off from said shaft portion is securely mounted by means of a screw member to the end of said shaft portion provided on said terminal engaging member, and a connecting portion with which a string is to be tied is provided integrally on said disk-shaped detachment preventing member, wherein said terminal plate comprises a first and second side plate and said shaft portion engages the bottom surface of said terminal metal member and said engaging portion engages said first side plate, wherein said connecting portion comprises a first and second connecting portion corresponding to a positive side and negative side battery terminal respectively and the first and second connecting portions are tied to each other by said string.

2. The terminal connection structure of claim 1, wherein said nut is provided at a multi-thread screw portion on said shaft portion.

3. The terminal connection structure of claim 1 wherein the length from an axial line of said shaft portion to approximately an end of said engaging portion is set greater than the length from the center of said attachment hole to said side plate by a value exceeding a deviation obtained by subtracting the diameter of said shaft portion from the diameter of said attachment hole.

4. The terminal connection structure of claim 1, wherein a tapered chamfered portion is formed on an outer periphery of approximately an end portion of said nut adjacent said terminal plate.

5. The terminal connection structure of claim 1, wherein the nut for the terminal connector is a pair of nuts for a pair of terminal connectors individually corresponding to the positive side and negative side battery terminals and the nuts of the pair of nuts are colored in different colors from each other.

6. The terminal connection structure for a battery according to claim 5, wherein a transverse sectional outer profile of said nut is formed in one of a polygonal shape and a circular shape having a plurality of grooves.

7. The terminal connection structure for a battery according to claim 1, wherein said connecting portion is provided on said detachment preventing member such that the position thereof along a circumferential direction of said nut is substantially the same as the position of said engaging portion of said terminal engaging member.

8. The terminal connection structure for a battery according to claim 1, wherein a tag serving as a sign is provided on said string.

9. A terminal connection structure for a battery which is electrically connected to a battery terminal, comprising:

a terminal plate having an attachment hole provided therein and a side plate connected perpendicularly to said terminal plate;

a terminal metal member having a fitting hole corresponding to said attachment hole and provided at an end portion of a cable to contact a surface of said terminal plate by way of a terminal connector, wherein said terminal connector includes a terminal engaging member, integrally comprising a shaft portion and an engaging portion, wherein said shaft portion is fitted in said fitting hole and said attachment hole so that said terminal metal member is contacted with the surface of said terminal plate, said engaging portion is projected sidewardly from an end of said shaft portion, engaging with a rear face of said terminal plate and formed in a substantially L-shape, wherein the length from an axial line of said shaft portion to approximately an end of said engaging portion is set greater than the length from the center of said attachment hole to said side plate by a value exceeding a deviation obtained by subtracting the diameter of said shaft portion from the diameter of said attachment hole, and said terminal metal member is provided between a nut screwed on said shaft portion of said terminal engaging member and the surface of said terminal plate, wherein a detachment preventing member for preventing said nut from coming off from said shaft portion is securely mounted at the other end of said shaft portion provided on said terminal engaging member, and a connecting portion with which a string is to be tied is provided integrally on said detachment preventing member.

* * * * *